United States Patent
Zheng et al.

(10) Patent No.: US 12,407,382 B2
(45) Date of Patent: Sep. 2, 2025

(54) METHOD FOR DETERMINING TRANSMISSION/RECEPTION ARRAY OF OAM SYSTEM, TERMINAL DEVICE, ACCESS NETWORK DEVICE AND STORAGE MEDIUM

(71) Applicant: BEIJING XIAOMI MOBILE SOFTWARE CO., LTD., Beijing (CN)

(72) Inventors: Feng Zheng, Beijing (CN); Siwei Ji, Beijing (CN); Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 61 days.

(21) Appl. No.: 18/553,494

(22) PCT Filed: Mar. 31, 2021

(86) PCT No.: PCT/CN2021/084705
§ 371 (c)(1),
(2) Date: Sep. 29, 2023

(87) PCT Pub. No.: WO2022/205195
PCT Pub. Date: Oct. 6, 2022

(65) Prior Publication Data
US 2024/0364396 A1 Oct. 31, 2024

(51) Int. Cl.
*H04B 7/06* (2006.01)
*H04B 7/08* (2006.01)

(52) U.S. Cl.
CPC .......... *H04B 7/0604* (2013.01); *H04B 7/061* (2013.01); *H04B 7/0691* (2013.01); *H04B 7/0802* (2013.01); *H04B 7/0874* (2013.01)

(58) Field of Classification Search
CPC .. H04B 7/0604; H04B 7/0602; H04B 7/0874; H04B 7/061; H04B 7/0802; H04B 7/0691; H04B 7/0413; H04J 14/07
See application file for complete search history.

(56) References Cited

U.S. PATENT DOCUMENTS

| | | | |
|---|---|---|---|
| 11,177,990 B1 * | 11/2021 | Gil | H01Q 21/20 |
| 2020/0296599 A1 * | 9/2020 | Sasaki | H04B 7/0469 |
| 2020/0304180 A1 * | 9/2020 | Lee | H04L 27/2602 |
| 2022/0416848 A1 * | 12/2022 | Zhang | H04B 7/0695 |
| 2023/0171056 A1 * | 6/2023 | Huang | H04B 7/0617 370/328 |
| 2023/0396294 A1 * | 12/2023 | Huang | H04B 7/0617 |
| 2023/0403095 A1 * | 12/2023 | Huang | H04B 7/0697 |
| 2024/0014550 A1 * | 1/2024 | Zhang | H04W 28/0215 |
| 2024/0014553 A1 * | 1/2024 | Yamada | H01Q 3/26 |

FOREIGN PATENT DOCUMENTS

| | | |
|---|---|---|
| CN | 109842435 A | 6/2019 |
| WO | WO 2017/124967 A1 | 7/2017 |

\* cited by examiner

*Primary Examiner* — Aristocratis Fotakis
(74) *Attorney, Agent, or Firm* — Oblon, McClelland, Maier & Neustadt, L.L.P.

(57) ABSTRACT

A method for determining a transmission array of an orbital angular momentum (OAM) system, performed by a transmitter, that can include determining a plurality of transmission arrays from a first concentric circular array of the transmitter, transmitting, respectively and sequentially by the plurality of transmission arrays, a first reference signal to a receiver, and receiving first target index information from the receiver, and determining the transmission array of the OAM system based on the first target index information.

18 Claims, 10 Drawing Sheets

METHOD FOR DETERMINING TRANSMISSION/RECEPTION ARRAY OF OAM SYSTEM, TERMINAL DEVICE, ACCESS NETWORK DEVICE AND STORAGE MEDIUM

CROSS-REFERENCE TO RELATED APPLICATION

This application is a national phase of International Application No. PCT/CN2021/084705, filed on Mar. 31, 2021, the entire content of which is incorporated herein by reference.

BACKGROUND

Technical Field

The disclosure relates to the field of communication technologies, and particularly to a method for determining a transmission/reception array of an orbital angular momentum (OAM) system, a terminal device, an access network device and a storage medium.

Description of the Related Art

Orbit angular momentum (OAM), as a new modulation dimension, may transmit/receive multi-path information in the same frequency band simultaneously, which may effectively solve the problem of shortage in spectrum resources. An OAM communication system is usually established based on a uniform circular array (UCA). There are different OAM modes in the OAM communication system, different modes may correspond to different optimal transceiving arrays, and a change of a distance between a receiver and a transmitter may influence a selection of an optimal transceiving array.

SUMMARY

According to an aspect of the disclosure, a method for determining a transmission array of an OAM system is provided. The method is performed by a transmitter. The method includes determining a plurality of transmission arrays from a first concentric circular array of the transmitter, transmitting, respectively and sequentially by the plurality of transmission arrays, a first reference signal to a receiver, and receiving first target index information from the receiver, and determining a transmission array of the OAM system based on the first target index information.

According to another aspect of the disclosure, a method for determining a transmission/reception array of an OAM system is provided. The method is performed by a receiver. The method includes receiving a plurality of first reference signals that are transmitted sequentially by a transmitter, determining a first target signal from the plurality of first reference signals, and determining a target transmission array based on the first target signal, and transmitting first target index information corresponding to the target transmission array to the transmitter, to cause the transmitter to determine a transmission array of the OAM system based on the first target index information.

According to another aspect of the disclosure, a terminal device is provided and includes a transceiver, a memory, and a processor respectively connected to the transceiver and the memory and configured to control transceiving of wireless signals of the transceiver and perform the method as described in the above any one embodiment, by executing computer executable instructions on the memory.

BRIEF DESCRIPTION OF THE DRAWINGS

The above and/or additional aspects and advantages of the disclosure will become apparent and easy to understand from the following description of the embodiments in conjunction with the accompanying drawings, in which.

DETAILED DESCRIPTION OF THE PREFERRED EMBODIMENTS

Figure 1:
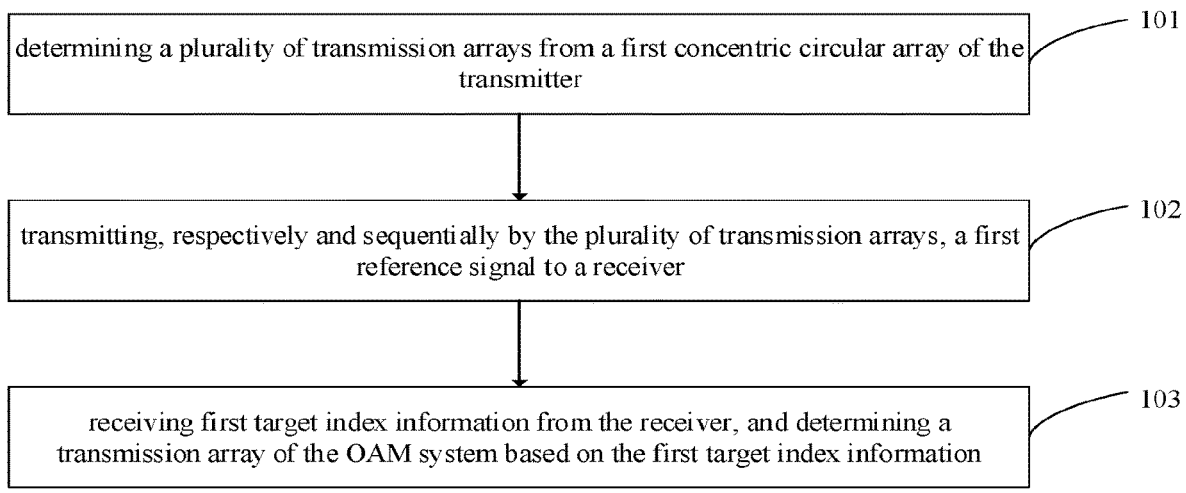
FIG. 1 is a flowchart illustrating a method for determining a transmission/reception array of an OAM system provided in some embodiments of the disclosure.

Reference will now be made in detail to some embodiments of the disclosure, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with embodiments of the disclosure. Instead, they are merely examples of apparatuses and methods consistent with aspects related to embodiments of the disclosure as recited in the appended claims.

The terms used in embodiments of the disclosure are only for the purpose of describing specific embodiments, and are not intended to limit embodiments of the disclosure. The singular forms of "a" and "the" used in embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in embodiments of the disclosure to describe various information, the information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the word "if" as used herein can be interpreted as "when", "while" or "in response to determining".

The embodiments of the disclosure are described in detail below. Examples of the embodiments are illustrated in the accompanying drawings where the same or similar numbers throughout indicate the same or similar elements. The embodiments described below by reference to the accompanying drawings are illustrative and are intended to interpret the disclosure and are not to be construed as a limitation of the disclosure.

In the method for determining a transmission/reception array of an OAM system provided in embodiments of the disclosure, the plurality of transmission arrays are determined from the first concentric circular array (or concentric ring array) of the transmitter, the first reference signal is transmitted sequentially and respectively by the plurality of transmission arrays to the receiver, the first target index information from the receiver is received, and the transmission array of the OAM system is determined based on the first target index information. It can be seen that, in embodiments of the disclosure, an optimal target transmission array of the transmitter at a current moment is determined in advance before signals are transmitted, and the optimal target transmission array is determined as the transmission array of the OAM system, so that the signals are transmitted by using the transmission array of the OAM system. Thus, even if the transceiver is in a mobile scenario or the transmitter transmits OAM signals in different modes, the transmitter may ensure that the signals are transmitted via the optimal transmission array when transmitting the signals each time, which effectively solves an OAM communication problem in a coaxial, multi-modal and mobile scenario.

A method and an apparatus for determining a transmission/reception array of an OAM system, a terminal device, an access network device and a storage medium provided in the disclosure are described below referring to the accompanying drawings.

FIG. 1 is a flowchart illustrating a method for determining a transmission/reception array of an OAM system provided in some embodiments of the disclosure. As illustrated in FIG. 1, the method for determining a transmission/reception array of an OAM system is performed by a transmitter and may include the following steps.

At step 101, a plurality of transmission arrays are determined from a first concentric circular array of the transmitter.

It should be noted that, the transmitter may be a base station or a user equipment (UE). The transmitter in embodiments of the disclosure may be any UE or any access network device (such as a base station). The UE may refer to a device that provides voice and/or data connectivity for a user. The UE may communicate with one or more core networks via a radio access network (RAN). The UE may be an internet of things (IoT) terminal such as a sensor device, a mobile phone (or referred to as a cellular phone), or a computer having an IoT terminal such as a fixed, portable, compact, handheld, computer built-in or vehicle built-in device, for example, a station (STA), a subscriber unit, a subscriber station, a mobile station, a mobile, a remote station, an access point, a remote terminal, an access terminal, a user terminal, or a user agent. Alternatively, the UE may be a device of an unmanned aerial vehicle (UAV). Alternatively, the UE may be a vehicle built-in device, for example, a vehicle computer with a wireless communication function, or a wireless terminal externally connected to a vehicle computer. Alternatively, the UE may be a roadside device, for example, a street lamp, a signal lamp or other roadside device with a wireless communication function.

In some embodiments of the disclosure, the first concentric circular array of the transmitter may include at least two circular arrays and radiuses of different circular arrays are different.

In some embodiments of the disclosure, a plurality of circular arrays in the first concentric circular array of the transmitter may be determined as the plurality of transmission arrays. In other embodiments of the disclosure, all circular arrays in the first concentric circular array of the transmitter may be determined as the plurality of transmission arrays.

At step 102, a first reference signal is transmitted respectively and sequentially by the plurality of transmission arrays to a receiver.

In some embodiments of the disclosure, a transmission direction adopted when the transmitter transmits the first reference signal by each of the plurality of transmission arrays may be the same.

In some embodiments of the disclosure, when the transmitter transmits the first reference signal by the plurality of transmission arrays, the receiver receives the plurality of first reference signals in a fixed receiving direction always by a fixed receiving array.

At step 103, first target index information from the receiver is received, and a transmission array of the OAM system is determined based on the first target index information.

In some embodiments of the disclosure, corresponding first index information for each transmission array of the transmitter may be preconfigured, to form a corresponding relationship between first index information and transmission arrays and store the corresponding relationship.

In some embodiments of the disclosure, the first target index information received by the transmitter may be first index information corresponding to a target transmission array selected by the receiver from the plurality of first reference signals based on signal qualities. In some embodiments of the disclosure, the target transmission array may be a transmission array corresponding to a first reference signal with the best signal quality in the plurality of first reference signals.

In some embodiments of the disclosure, the receiver may select a first target signal with the best signal quality from the plurality of first reference signals based on a reference signal receiving power (RSRP) and/or a reference signal receiving quality (RSRQ) and/or a signal to interference plus noise ratio (SINR). In some embodiments of the disclosure, for example, a first reference signal with a maximum RSRP and/or a maximum RSRQ in the plurality of first reference signals may be determined as the first target signal.

In other embodiments of the disclosure, the receiver may select a first target signal from the plurality of first reference signals based on a bit error rate (BER) and/or a block error ratio (BLER). In some embodiments of the disclosure, a first reference signal with a minimum BER and/or a minimum BLER in the plurality of first reference signals may be determined as the first target signal.

It should be noted that, in some embodiments of the disclosure, when the transmitter transmits a signal each time, the method as illustrated in FIG. 1 may be performed, so that the transmitter may determine an optimal transmission array at a current moment as the transmission array of the OAM system when transmitting the signal each time.

In the method for determining a transmission/reception array of an OAM system provided in embodiments of the disclosure, the plurality of transmission arrays are determined from the first concentric circular array of the transmitter, the first reference signal is transmitted sequentially and respectively by the plurality of transmission arrays to the receiver, the first target index information from the receiver is received, and the transmission array of the OAM system is determined based on the first target index information. It can be seen that, in embodiments of the disclosure, an optimal target transmission array of the transmitter at a current moment is determined in advance before signals are transmitted, and the optimal target transmission array is determined as the transmission array of the OAM system, so that the signals are transmitted by using the transmission array of the OAM system. Thus, even if the transceiver is in a mobile scenario or the transmitter transmits OAM signals in different modes, the transmitter may ensure that the signals are transmitted via the optimal transmission array when transmitting the signals each time, which effectively solves an OAM communication problem in a coaxial, multi-modal and mobile scenario.

Figure 2:
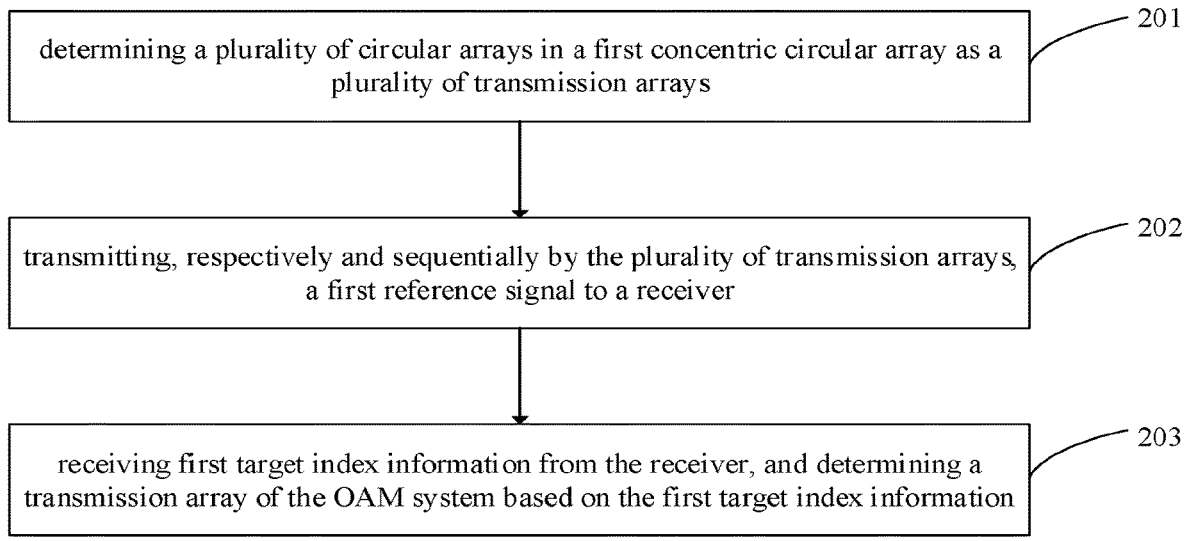
FIG. 2 is a flowchart illustrating another method for determining a transmission/reception array of an OAM system provided in some embodiments of the disclosure.

FIG. 2 is a flowchart illustrating another method for determining a transmission/reception array of an OAM system provided in some embodiments of the disclosure. As illustrated in FIG. 2, the method for determining a transmission/reception array of an OAM system is performed by a transmitter and may include the following steps.

At step 201, a plurality of circular arrays in a first concentric circular array of the transmitter are determined as a plurality of transmission arrays.

It should be noted that, the transmitter may be a base station or a UE. The transmitter in embodiments of the disclosure may be any UE or any access network device (such as a base station).

In some embodiments of the disclosure, all circular arrays in the first concentric circular array of the transmitter may be determined as the plurality of transmission arrays.

At step 202, a first reference signal is transmitted respectively and sequentially by the plurality of transmission arrays to a receiver.

In some embodiments of the disclosure, a transmission direction adopted when the transmitter transmits the first reference signal by each of the plurality of transmission arrays may be the same.

In some embodiments of the disclosure, when the transmitter transmits the first reference signal by the plurality of transmission arrays, the receiver receives the plurality of first reference signals in a fixed receiving direction always by a fixed receiving array.

At step 203, first target index information from the receiver is received, and a transmission array of the OAM system is determined based on the first target index information.

In some embodiments of the disclosure, corresponding first index information for each transmission array of the transmitter may be preconfigured, to form a corresponding relationship between first index information and transmission arrays and store the corresponding relationship.

In some embodiments of the disclosure, the first target index information received by the transmitter may be first index information corresponding to a target transmission array selected by the receiver from the plurality of first reference signals based on signal qualities. In some embodiments of the disclosure, the target transmission array may be a transmission array corresponding to a first reference signal with the best signal quality in the plurality of first reference signals.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select a first target signal from the plurality of first reference signals based on the BER and/or the BLER. In some embodiments of the disclosure, a first reference signal with a minimum BER and/or a minimum BLER in the plurality of first reference signals may be determined as the first target signal.

It needs to be noted that, in some embodiments of the disclosure, when the transmitter transmits a signal each time, the method as illustrated in FIG. 2 may be performed, so that the transmitter may determine an optimal transmission array at a current moment as the transmission array of the OAM system when transmitting the signal each time.

In the method for determining a transmission/reception array of an OAM system provided in embodiments of the disclosure, the plurality of transmission arrays are determined from the first concentric circular array of the transmitter, the first reference signal is transmitted sequentially and respectively by the plurality of transmission arrays to the receiver, the first target index information from the receiver is received, and the transmission array of the OAM system is determined based on the first target index information. It can be seen that, in embodiments of the disclosure, an optimal target transmission array of the transmitter at a current moment is determined in advance before signals are transmitted, and the optimal target transmission array is determined as the transmission array of the OAM system, so that the signals are transmitted by using the transmission array of the OAM system. Thus, even if the transceiver is in a mobile scenario or the transmitter transmits OAM signals in different modes, the transmitter may ensure that the signals are transmitted via the optimal transmission array when transmitting the signals each time, which effectively solves an OAM communication problem in a coaxial, multi-modal and mobile scenario.

Figure 3:
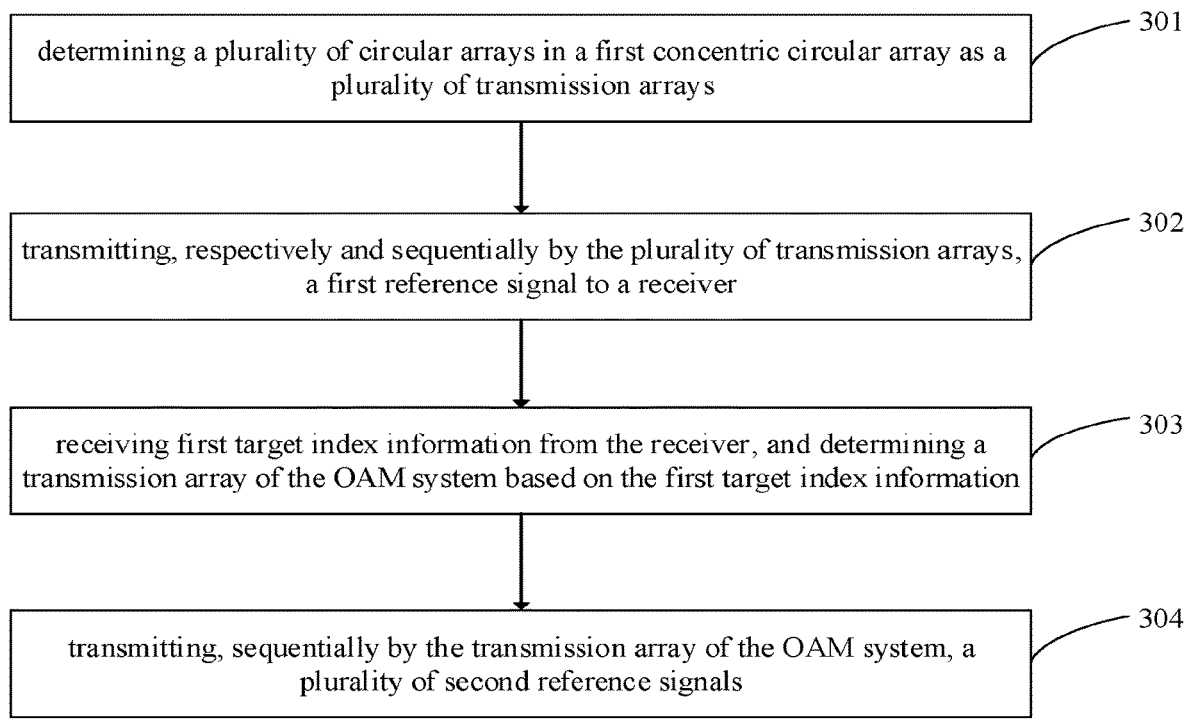
FIG. 3 is a flowchart illustrating still another method for determining a transmission/reception array of an OAM system provided in some embodiments of the disclosure.

FIG. 3 is a flowchart illustrating another method for determining a transmission/reception array of an OAM system provided in some embodiments of the disclosure. As illustrated in FIG. 3, the method for determining a transmission/reception array of an OAM system is performed by a transmitter and may include the following steps.

At step 301, a plurality of circular arrays in a first concentric circular array of the transmitter are determined as a plurality of transmission arrays.

It should be noted that, the transmitter may be a base station or a UE. The transmitter in embodiments of the disclosure may be any UE or any access network device (such as a base station).

In some embodiments of the disclosure, all circular arrays in the first concentric circular array of the transmitter may be determined as the plurality of transmission arrays.

At step 302, a first reference signal is transmitted respectively and sequentially by the plurality of transmission arrays to a receiver.

In some embodiments of the disclosure, a transmission direction adopted when the transmitter transmits the first reference signal by each of the plurality of transmission arrays may be the same.

In some embodiments of the disclosure, when the transmitter transmits the first reference signal by the plurality of transmission arrays, the receiver receives the plurality of first reference signals in a fixed receiving direction always by a fixed receiving array.

At step 303, first target index information from the receiver is received, and a transmission array of the OAM system is determined based on the first target index information.

In some embodiments of the disclosure, corresponding first index information for each transmission array of the transmitter may be preconfigured, to form a corresponding relationship between first index information and transmission arrays and store the corresponding relationship.

In some embodiments of the disclosure, the first target index information received by the transmitter may be first index information corresponding to a target transmission array selected by the receiver from the plurality of first reference signals based on signal qualities. In some embodiments of the disclosure, the target transmission array may be a transmission array corresponding to a first reference signal with the best signal quality in the plurality of first reference signals.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select a first target signal from the plurality of first reference signals based on the BER and/or the BLER. In some embodiments of the disclosure, a first reference signal with a minimum BER and/or a minimum BLER in the plurality of first reference signals may be determined as the first target signal.

It should be noted that, in some embodiments of the disclosure, when the transmitter transmits a signal each time, the method as illustrated in FIG. 3 may be performed, so that the transmitter may determine an optimal transmission array at a current moment as the transmission array of the OAM system when transmitting the signal each time.

At step 304, a plurality of second reference signals are transmitted sequentially by the transmission array of the OAM system.

In some embodiments of the disclosure, the transmitter may transmit the plurality of second reference signals sequentially by using the transmission array of the OAM system when the transmission array of the OAM system is determined based on the first target index information received, so that the receiver receives the plurality of second reference signals by different receiving arrays, and determines a receiving array of the OAM system based on qualities of the plurality of second reference signals.

It should be noted that, in some embodiments of the disclosure, when the transmitter transmits a signal each time, the method as illustrated in FIG. 3 may be performed, so that the transmitter may determine an optimal transmission array at a current moment as the transmission array of the OAM system when transmitting the signal each time.

In the method for determining a transmission/reception array of an OAM system provided in embodiments of the disclosure, the plurality of transmission arrays are determined from the first concentric circular array of the transmitter, the first reference signal is transmitted sequentially and respectively by the plurality of transmission arrays to the receiver, the first target index information from the receiver is received, and the transmission array of the OAM system is determined based on the first target index information. It can be seen that, in embodiments of the disclosure, an optimal target transmission array of the transmitter at a current moment is determined in advance before signals are transmitted, and the optimal target transmission array is determined as the transmission array of the OAM system, so that the signals are transmitted by using the transmission array of the OAM system. Thus, even if the transceiver is in a mobile scenario or the transmitter transmits OAM signals in different modes, the transmitter may ensure that the signals are transmitted via the optimal transmission array when transmitting the signals each time, which effectively solves an OAM communication problem in a coaxial, multi-modal and mobile scenario.

Figure 4:
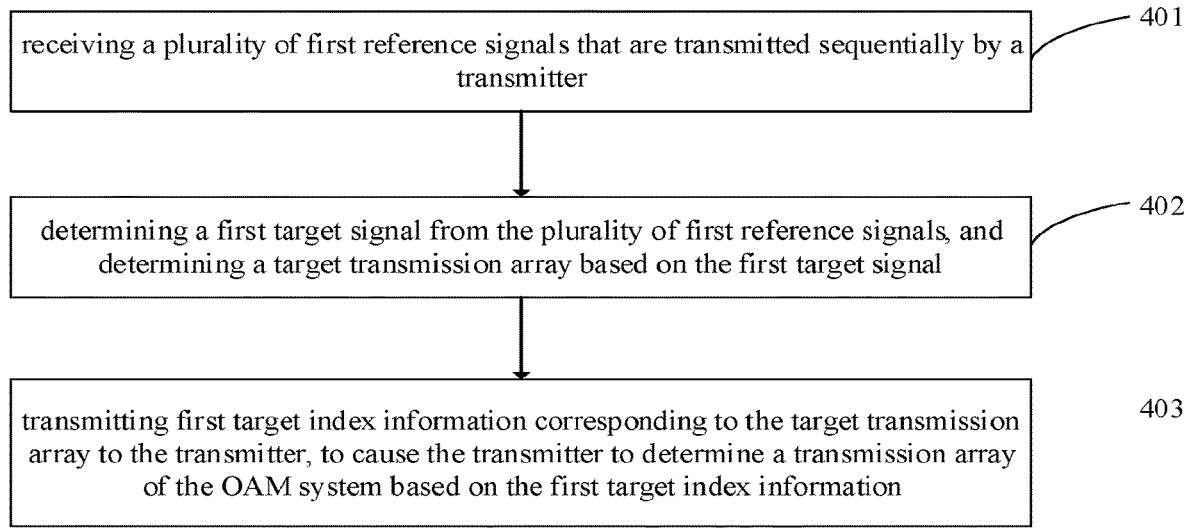
FIG. 4 is a flowchart illustrating another method for determining a transmission/reception array of an OAM system provided in some embodiments of the disclosure.

FIG. 4 is a flowchart illustrating a method for determining a transmission/reception array of an OAM system provided in some embodiments of the disclosure. As illustrated in FIG. 4, the method for determining a transmission/reception array of an OAM system is performed by a receiver and may include the following steps.

At step 401, a plurality of first reference signals that are transmitted sequentially by a transmitter are received.

In some embodiments of the disclosure, the receiver in embodiments of the disclosure may be any UE or any access network device (such as a base station). It needs to be noted that, when the transmitter is a UE, the receiver may be a base station; and when the transmitter is a base station, the receiver may be a UE.

The plurality of first reference signals may be transmitted by the transmitter in a fixed transmitting direction by using different transmission arrays.

Further, in some embodiments of the disclosure, the receiver may include a second concentric circular array, the second concentric circular array may include at least two circular arrays, and radiuses of different circular arrays are different. A number of circular arrays in the second concentric circular array is the same as a number of circular arrays in the first concentric circular array of the transmitter. The second concentric circular array may be taken as a receiving array of the receiver, to receive signals transmitted by the transmitter.

In some embodiments of the disclosure, when the receiver receives the plurality of first reference signals, the receiver may receive the plurality of first reference signals in a fixed receiving direction by a fixed receiving array.

At step 402, a first target signal is determined from a plurality of first reference signals, and a target transmission array is determined based on the first target signal.

In some embodiments of the disclosure, the receiver may select the first target signal from the plurality of first reference signals based on signal qualities.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select the first target signal from the plurality of first reference signals based on the BER and/or the BLER. In some embodiments of the disclosure, a first reference signal with a minimum BER and/or a minimum BLER in the plurality of first reference signals may be determined as the first target signal.

In some embodiments of the disclosure, when the first target signal is determined, the transmission array for transmitting the first target signal may be determined as the target transmission array.

At step 403, first target index information corresponding to the target transmission array is transmitted to the transmitter, to cause the transmitter to determine a transmission array of the OAM system based on the first target index information.

The receiver may determine the first target index information corresponding to the target transmission array based on a prestored mapping relationship between first index information and transmission arrays, and transmit the first target index information to the transmitter, so that the transmitter may determine the corresponding target transmission array based on the first target index information, and determine the target transmission array as the transmission array of the OAM system.

In the method for determining a transmission/reception array of an OAM system provided in embodiments of the disclosure, before transmitting the signals, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system. Thus, even if the transceiver is in a mobile scenario or the transmitter transmits OAM signals in different modes, the transmitter may ensure that the signals are transmitted via the optimal transmission array when transmitting the signals each time, which effectively solves an OAM communication problem in a coaxial, multi-modal and mobile scenario.

Figure 5:
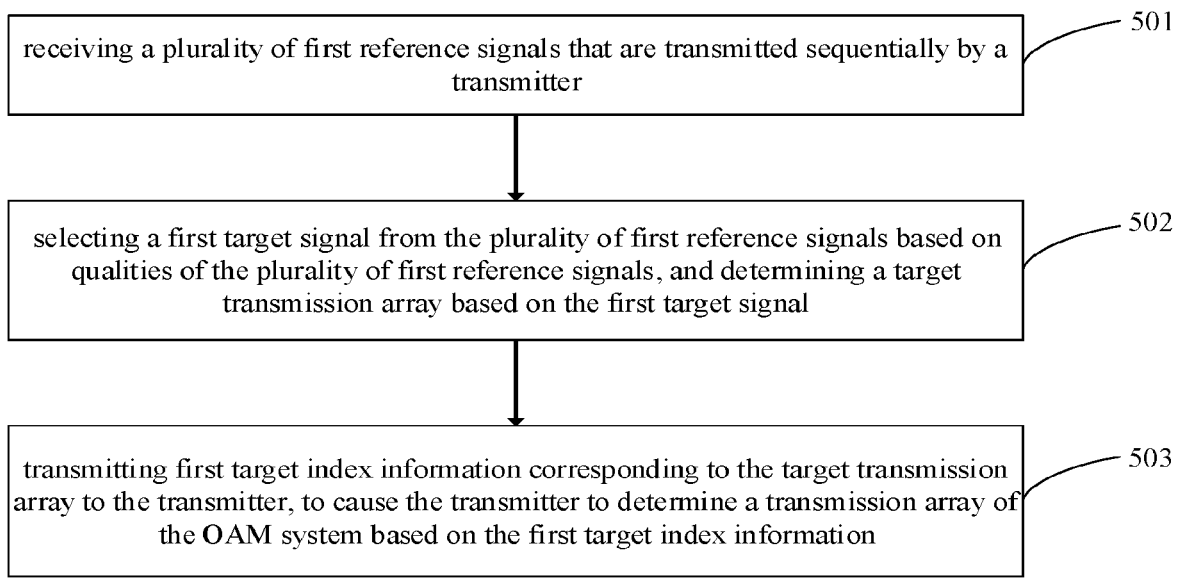
FIG. 5 is a flowchart illustrating another method for determining a transmission/reception array of an OAM system provided in some embodiments of the disclosure.

FIG. 5 is a flowchart illustrating a method for determining a transmission/reception array of an OAM system provided in some embodiments of the disclosure. As illustrated in FIG. 5, the method for determining a transmission/reception array of an OAM system is performed by a receiver and may include the following steps.

At step 501, a plurality of first reference signals that are transmitted sequentially by a transmitter are received.

In some embodiments of the disclosure, the receiver in embodiments of the disclosure may be any UE or any access network device (such as a base station). It needs to be noted that, when the transmitter is a UE, the receiver may be a base station, and when the transmitter is a base station, the receiver may be a UE.

The plurality of first reference signals may be transmitted by the transmitter in a fixed transmitting direction by using different transmission arrays.

Further, in some embodiments of the disclosure, the receiver may include a second concentric circular array, the second concentric circular array may include at least two circular arrays, and radiuses of different circular arrays are different. A number of circular arrays in the second concentric circular array is the same as a number of circular arrays in the first concentric circular array of the transmitter. The second concentric circular array may be taken as a receiving array of the receiver, to receive signals transmitted by the transmitter.

In some embodiments of the disclosure, when the receiver receives the plurality of first reference signals, the receiver may receive the plurality of first reference signals in a fixed receiving direction by a fixed receiving array.

At step 502, a first target signal is selected from the plurality of first reference signals based on qualities of the plurality of first reference signals, and a target transmission array is determined based on the first target signal.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select the first target signal from the plurality of first reference signals based on the BER and/or the BLER. In some embodiments of the disclosure, a first reference signal with a minimum BER and/or a minimum BLER in the plurality of first reference signals may be determined as the first target signal.

In some embodiments of the disclosure, when the first target signal is determined, the transmission array for transmitting the first target signal may be determined as the target transmission array.

At step 503, first target index information corresponding to the target transmission array is transmitted to the transmitter, to cause the transmitter to determine a transmission array of the OAM system based on the first target index information.

The receiver may determine the first target index information corresponding to the target transmission array based on a prestored mapping relationship between first index information and transmission arrays, and transmit the first target index information to the transmitter, so that the transmitter may determine the corresponding target transmission array based on the first target index information, and determine the target transmission array as the transmission array of the OAM system.

In the method for determining a transmission/reception array of an OAM system provided in embodiments of the disclosure, before transmitting the signals, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system. Thus, even if the transceiver is in a mobile scenario or the transmitter transmits OAM signals in different modes, the transmitter may ensure that the signals are transmitted via the optimal transmission array when transmitting the signals each time, which effectively solves an OAM communication problem in a coaxial, multi-modal and mobile scenario.

Figure 6:
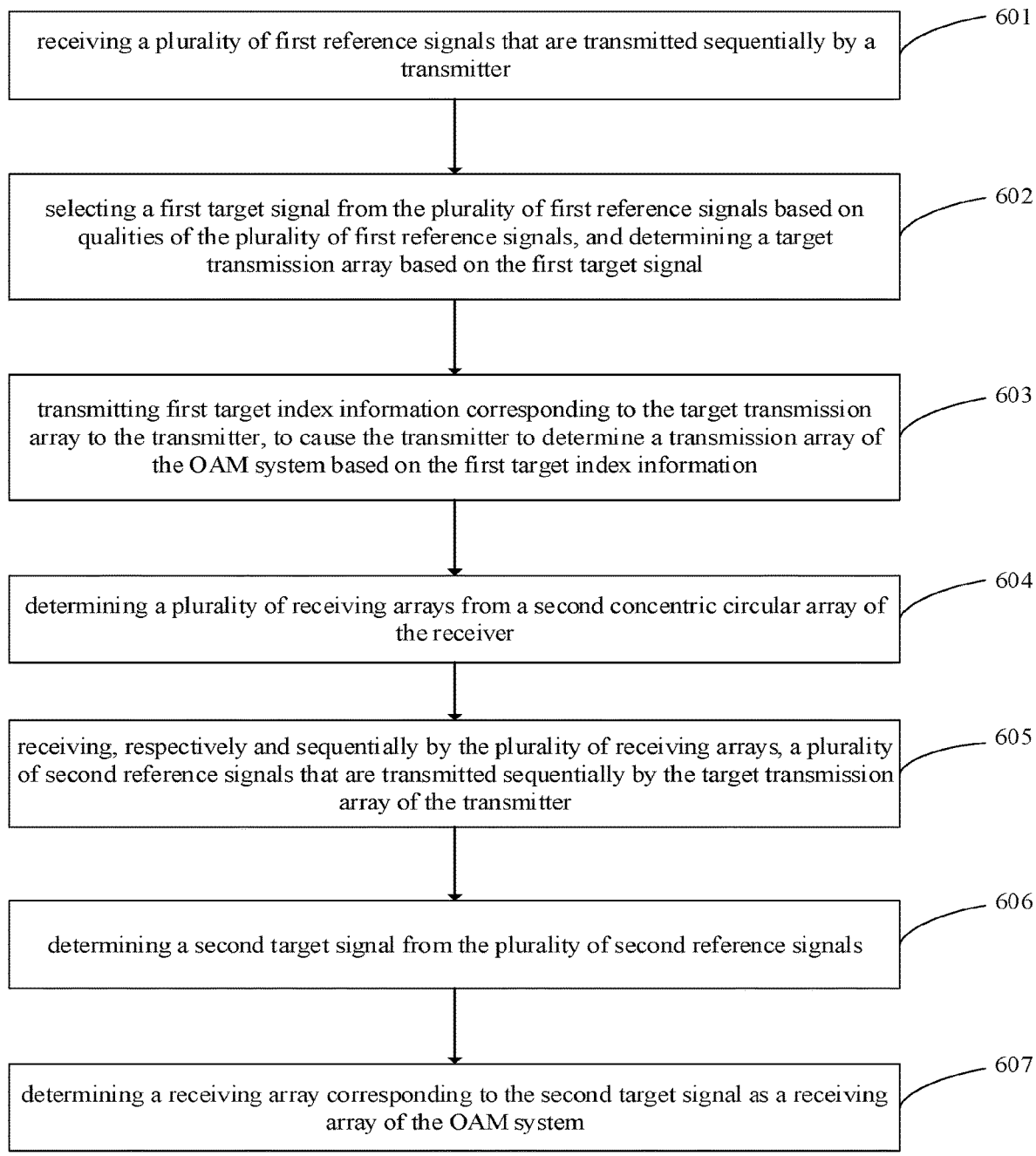
FIG. 6 is a flowchart illustrating another method for determining a transmission/reception array of an OAM system provided in some embodiments of the disclosure.

FIG. 6 is a flowchart illustrating a method for determining a transmission/reception array of an OAM system provided in some embodiments of the disclosure. As illustrated in FIG. 6, the method for determining a transmission/reception array of an OAM system is performed by a receiver and may include the following steps.

At step 601, a plurality of first reference signals that are transmitted sequentially by a transmitter are received.

In some embodiments of the disclosure, the receiver in embodiments of the disclosure may be any UE or any access network device (such as a base station). It needs to be noted that, when the transmitter is a UE, the receiver may be a base station; and when the transmitter is a base station, the receiver may be a UE.

The plurality of first reference signals may be transmitted by the transmitter in a fixed transmitting direction by using different transmission arrays.

Further, in some embodiments of the disclosure, the receiver may include a second concentric circular array, the second concentric circular array may include at least two circular arrays, and radiuses of different circular arrays are different. A number of circular arrays in the second concentric circular array is the same as a number of circular arrays in the first concentric circular array of the transmitter. The second concentric circular array may be taken as a receiving array of the receiver, to receive signals transmitted by the transmitter.

In some embodiments of the disclosure, when the receiver receives the plurality of first reference signals, the receiver may receive the plurality of first reference signals in a fixed receiving direction by a fixed receiving array.

At step 602, a first target signal is selected from the plurality of first reference signals based on qualities of the plurality of first reference signals, and a target transmission array is determined based on the first target signal.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select the first target signal from the plurality of first reference signals based on the BER and/or the BLER. In some embodiments of the disclosure, a first reference signal with a minimum BER and/or a minimum BLER in the plurality of first reference signals may be determined as the first target signal.

In some embodiments of the disclosure, when the first target signal is determined, the transmission array for transmitting the first target signal may be determined as the target transmission array.

At step 603, first target index information corresponding to the target transmission array is transmitted to the transmitter, to cause the transmitter to determine a transmission array of the OAM system based on the first target index information.

The receiver may determine the first target index information corresponding to the target transmission array based on a prestored mapping relationship between first index information and transmission arrays, and transmit the first target index information to the transmitter, so that the transmitter may determine the corresponding target transmission array based on the first target index information, and determine the target transmission array as the transmission array of the OAM system.

At step 604, a plurality of receiving arrays are determined from a second concentric circular array of the receiver.

In some embodiments of the disclosure, the second circular array may include at least two circular arrays and radiuses of different circular arrays are different. A number of circular arrays in the second concentric circular array is the same as a number of circular arrays in the first concentric circular array of the transmitter. In other embodiments of the disclosure, all circular arrays in the second concentric circular array of the receiver may be determined as the plurality of receiving arrays.

At step 605, a plurality of second reference signals that are transmitted sequentially by the transmitter by the transmission array of the OAM system are received respectively and sequentially by the plurality of receiving arrays.

It should be noted that, in some embodiments of the disclosure, in a process that the receiver receives the plurality of second reference signals, the transmitter transmits the plurality of second reference signals in a fixed direction always by the determined transmission array of the OAM system.

In some embodiments of the disclosure, when the receiver receives the plurality of second reference signals by the plurality of receiving arrays, a receiving direction of each receiving array may be the same.

At step 606, a second target signal is determined from the plurality of second reference signals.

In some embodiments of the disclosure, the receiver may select the second target signal from the plurality of second reference signals based on signal qualities.

In some embodiments of the disclosure, the receiver may select the second target signal from the plurality of second reference signals based on the RSRP and/or the RSRQ and/or the SINR. In some embodiments of the disclosure, a second reference signal with a maximum RSRP and/or a maximum RSRQ in the plurality of second reference signals may be determined as the second target signal.

In other embodiments of the disclosure, the receiver may select the second target signal from the plurality of second reference signals based on the BER and/or the BLER. In some embodiments of the disclosure, a second reference signal with a minimum BER and/or a minimum BLER in the plurality of second reference signals may be determined as the second target signal.

At step 607, a receiving array corresponding to the second target signal is determined as a receiving array of the OAM system.

In some embodiments of the disclosure, when the receiving array of the OAM system is determined, second target index information corresponding to the receiving array of the OAM system may be matched with the first target index information corresponding to the transmission array of the OAM system and they are stored, so that when the transmitter subsequently transmits a beam by the transmission array of the OAM system, the receiver may receive the beam directly by the corresponding receiving array of the OAM system based on the prestored matching relationship.

In other embodiments of the disclosure, the transmitter may indicate the transmission array used by the transmitter via a signaling. For example, the signaling may include the first target index information, and the transmitter may determine the target transmission array based on the first target index information, to transmit the beam.

In the method for determining a transmission/reception array of an OAM system provided in embodiments of the disclosure, before transmitting the signals, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system; and the receiver receives, respectively by the plurality of receiving arrays, the plurality of second reference signals that are transmitted by the transmitter by the determined transmission array of the OAM system, determines an optimal receiving array of the OAM system of the receiver at a current moment based on qualities of the plurality of second reference signals, and receives the signals by the receiving array of the OAM system.

Thus, even if the transceiver is in a mobile scenario or the transmitter transmits OAM signals in different modes, the transmitter may ensure that the signals are transmitted via an optimal transmission array when transmitting the signals each time, and the receiver may ensure that the signals are received via an optimal receiving array when receiving the signals each time, which effectively solves the OAM communication problem in the coaxial, multi-modal and mobile scenario.

In addition, in embodiments of the disclosure, when the transmission array of the OAM system and the receiving array of the OAM system are determined, the transmission arrays of the OAM system in different cases may be correspondingly matched with the receiving arrays of the OAM system and they are stored, so that when the transmitter subsequently transmits the signals by the transmission array of the OAM system again, the receiver may directly determine the receiving array of the OAM system matching the transmission array of the OAM system based on the pre-stored matching relationship between transmission arrays and receiving arrays, and determine an optimal receiving array of the OAM system without necessarily traversing each receiving array, which reduces steps and improves efficiency.

Figure 7:
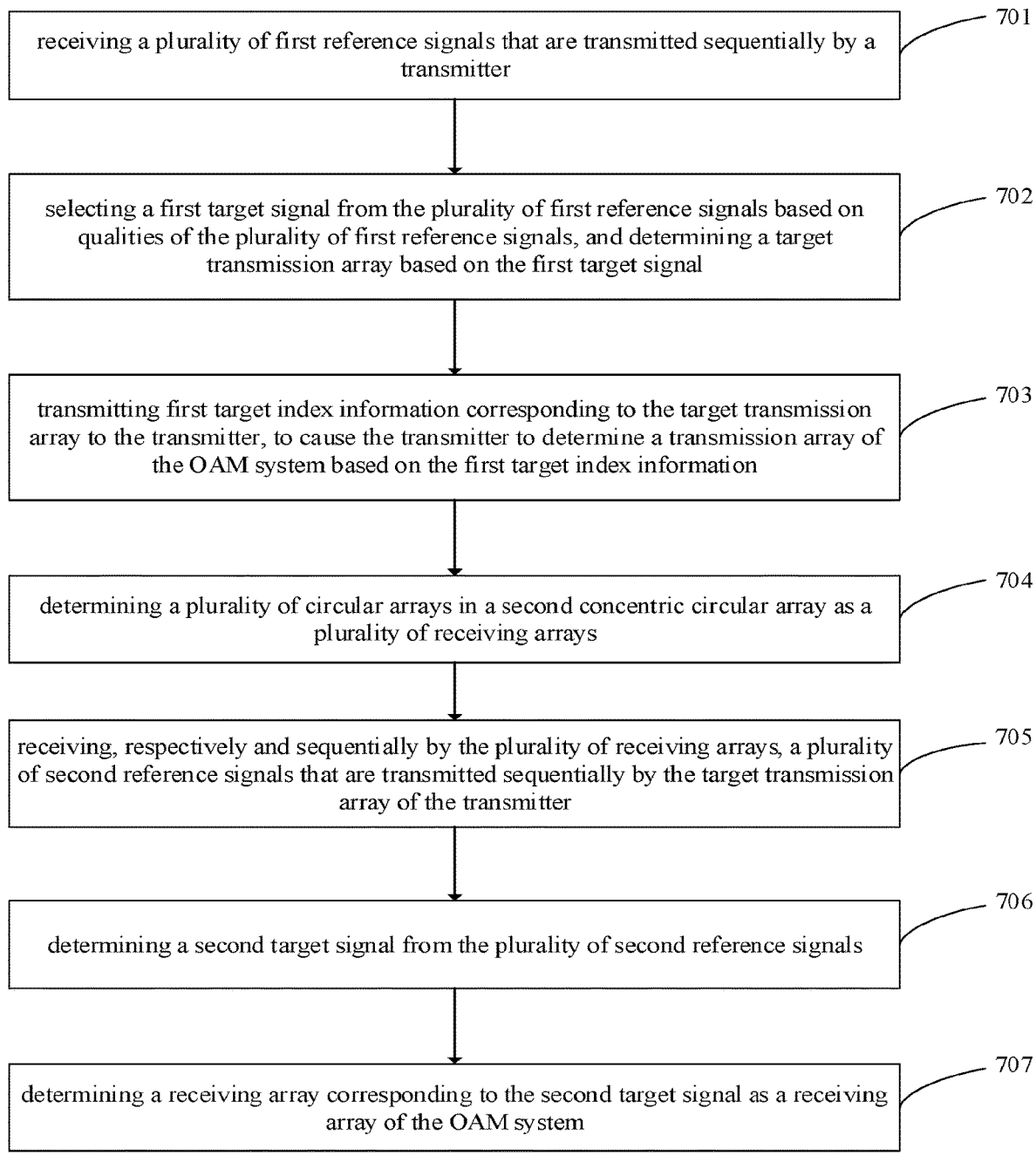
FIG. 7 is a flowchart illustrating another method for determining a transmission/reception array of an OAM system provided in some embodiments of the disclosure.

FIG. 7 is a flowchart illustrating a method for determining a transmission/reception array of an OAM system provided in some embodiments of the disclosure. As illustrated in FIG. 7, the method for determining a transmission/reception array of an OAM system is performed by a receiver and may include the following steps.

At step 701, a plurality of first reference signals that are transmitted sequentially by a transmitter are received.

In some embodiments of the disclosure, the receiver in embodiments of the disclosure may be any UE or any access network device (such as a base station). It needs to be noted that, when the transmitter is a UE, the receiver may be a base station; and when the transmitter is a base station, the receiver may be a UE.

The plurality of first reference signals may be transmitted by the transmitter in a fixed transmitting direction by using different transmission arrays.

Further, in some embodiments of the disclosure, the receiver may include a second concentric circular array, the second concentric circular array may include at least two circular arrays, and radiuses of different circular arrays are different. A number of circular arrays in the second concentric circular array is the same as a number of circular arrays in the first concentric circular array of the transmitter. The second concentric circular array may be taken as a receiving array of the receiver, to receive signals transmitted by the transmitter.

In some embodiments of the disclosure, when the receiver receives the plurality of first reference signals, the receiver may receive the plurality of first reference signals in a fixed receiving direction by a fixed receiving array.

At step 702, a first target signal is selected from the plurality of first reference signals based on qualities of the plurality of first reference signals, and a target transmission array is determined based on the first target signal.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select the first target signal from the plurality of first reference signals based on the BER and/or the BLER. In some embodiments of the disclosure, a first reference signal with a minimum BER and/or a minimum BLER in the plurality of first reference signals may be determined as the first target signal.

At step 703, first target index information corresponding to the target transmission array is transmitted to the transmitter, to cause the transmitter to determine a transmission array of the OAM system based on the first target index information.

The receiver may determine the first target index information corresponding to the target transmission array based on a prestored mapping relationship between first index information and transmission arrays, and transmit the first target index information to the transmitter, so that the transmitter may determine the corresponding target transmission array based on the first target index information, and determine the target transmission array as the transmission array of the OAM system.

At step 704, a plurality of circular arrays in a second concentric circular array are determined as a plurality of receiving arrays.

In some embodiments of the disclosure, the second concentric circular array may include at least two circular arrays and radiuses of different circular arrays are different. A number of circular arrays in the second concentric circular array is the same as a number of circular arrays in the first concentric circular array of the transmitter. In other embodiments of the disclosure, all transmission arrays in the second concentric circular array of the receiver may be determined as the plurality of receiving arrays.

At step 705, a plurality of second reference signals that are transmitted sequentially by the transmitter by the determined transmission array of the OAM system are received respectively and sequentially by the plurality of receiving arrays.

It should be noted that, in some embodiments of the disclosure, in a process that the receiver receives the plurality of second reference signals, the transmitter transmits the plurality of second reference signals in a fixed direction always by the determined transmission array of the OAM system.

In some embodiments of the disclosure, when the receiver receives the plurality of second reference signals by the plurality of receiving arrays, a receiving direction of each receiving array may be the same.

At step 706, a second target signal is determined from the plurality of second reference signals.

In some embodiments of the disclosure, the receiver may select the second target signal from the plurality of second reference signals based on signal qualities.

In some embodiments of the disclosure, the receiver may select the second target signal from the plurality of second reference signals based on the RSRP and/or the RSRQ and/or the SINR. In some embodiments of the disclosure, a second reference signal with a maximum RSRP and/or a maximum RSRQ in the plurality of second reference signals may be determined as the second target signal.

In other embodiments of the disclosure, the receiver may select the second target signal from the plurality of second reference signals based on the BER and/or the BLER. In some embodiments of the disclosure, a second reference signal with a minimum BER and/or a minimum BLER in the plurality of second reference signals may be determined as the second target signal.

At step 707, a receiving array corresponding to the second target signal is determined as a receiving array of the OAM system.

In other embodiments of the disclosure, when the receiving array of the OAM system is determined, second target index information corresponding to the receiving array of the OAM system may be matched with first target index information corresponding to the transmission array of the OAM system and they are stored, so that when the transmitter subsequently transmits a beam by the transmission array of the OAM system, the receiver may receive the beam directly by the corresponding receiving array of the OAM system based on a prestored matching relationship.

In other embodiments of the disclosure, the transmitter may indicate the transmission array used by the transmitter via a signaling. For example, the signaling may include the first target index information, and the transmitter may determine the target transmission array based on the first target index information, to transmit the beam.

In the method for determining a transmission/reception array of an OAM system provided in embodiments of the disclosure, before transmitting the signals, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system; and the receiver receives, respectively by the plurality of receiving arrays, the plurality of second reference signals that are transmitted by the transmitter by the determined transmission array of the OAM system, determines an optimal receiving array of the OAM system of the receiver at a current moment based on qualities of the plurality of second reference signals, and receives the signals by the receiving array of the OAM system.

Thus, even if the transceiver is in a mobile scenario or the transmitter transmits OAM signals in different modes, the transmitter may ensure that the signals are transmitted via an optimal transmission array when transmitting the signals each time, and the receiver may ensure that the signals are received via an optimal receiving array when receiving the signals each time, which effectively solves the OAM communication problem in the coaxial, multi-modal and mobile scenario.

In addition, in embodiments of the disclosure, when the transmission array of the OAM system and the receiving array of the OAM system are determined, the transmission arrays of the OAM system in different cases may be correspondingly matched with the receiving arrays of the OAM system and they are stored, so that when the transmitter subsequently transmits the signals by the transmission array of the OAM system again, the receiver may directly determine the receiving array of the OAM system matching the transmission array of the OAM system based on the pre-stored matching relationship between transmission arrays and receiving arrays, and determine an optimal receiving array of the OAM system without necessarily traversing each receiving array, which reduces steps and improves efficiency.

Figure 8:
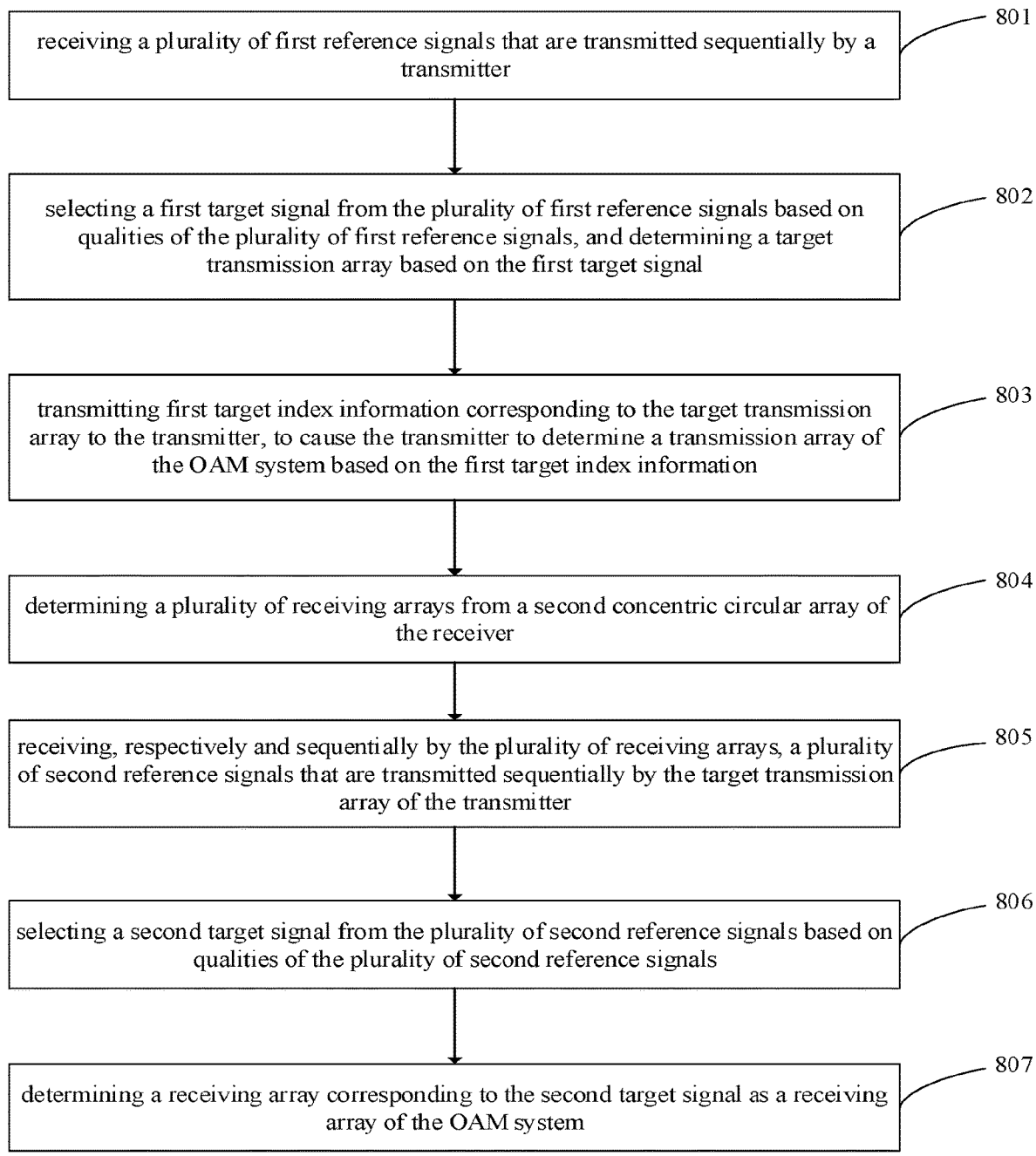
FIG. 8 is a flowchart illustrating another method for determining a transmission/reception array of an OAM system provided in some embodiments of the disclosure.

FIG. 8 is a flowchart illustrating another method for determining a transmission/reception array of an OAM system provided in some embodiments of the disclosure. As illustrated in FIG. 8, the method for determining a transmission/reception array of an OAM system is performed by a receiver and may include the following steps.

At step 801, a plurality of first reference signals that are transmitted sequentially by a transmitter are received.

In some embodiments of the disclosure, the receiver in embodiments of the disclosure may be any UE or any access network device (such as a base station). It needs to be noted that, when the transmitter is a UE, the receiver may be a base station; and when the transmitter is a base station, the receiver may be a UE.

The plurality of first reference signals may be transmitted by the transmitter in a fixed transmitting direction by using different transmission arrays.

Further, in some embodiments of the disclosure, the receiver may include a second concentric circular array, the second concentric circular array may include at least two circular arrays, and radiuses of different circular arrays are different. A number of circular arrays in the second concentric circular array is the same as a number of circular arrays in the first concentric circular array of the transmitter. The second concentric circular array may be taken as a receiving array of the receiver, to receive signals transmitted by the transmitter.

In some embodiments of the disclosure, when the receiver receives the plurality of first reference signals, the receiver may receive the plurality of first reference signals in a fixed receiving direction by a fixed receiving array.

At step 802, a first target signal is selected from the plurality of first reference signals based on qualities of the plurality of first reference signals, and a target transmission array is determined based on the first target signal.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select the first target signal from the plurality of first reference signals based on the BER and/or the BLER. In some embodiments of the disclosure, a first reference signal with a minimum BER and/or a minimum BLER in the plurality of first reference signals may be determined as the first target signal.

At step 803, first target index information corresponding to the target transmission array is transmitted to the transmitter, to cause the transmitter to determine a transmission array of the OAM system based on the first target index information.

The receiver may determine the first target index information corresponding to the target transmission array based on a prestored mapping relationship between first index information and transmission arrays, and transmit the first target index information to the transmitter, so that the transmitter may determine the corresponding target transmission array based on the first target index information, and determine the target transmission array as the transmission array of the OAM system.

At step 804, a plurality of receiving arrays are determined from a second concentric circular array of the receiver.

In some embodiments of the disclosure, the second circular array may include at least two circular arrays and radiuses of different circular arrays are different. A number of circular arrays in the second concentric circular array is the same as a number of circular arrays in the first concentric circular array of the transmitter. In other embodiments of the disclosure, all circular arrays in the second concentric circular array of the receiver may be determined as the plurality of receiving arrays.

At step 805, a plurality of second reference signals that are transmitted sequentially by the transmitter by the transmission array of the OAM system are received respectively and sequentially by the plurality of receiving arrays.

It should be noted that, in some embodiments of the disclosure, in a process that the receiver receives the plurality of second reference signals, the transmitter transmits the plurality of second reference signals in a fixed direction always by the determined transmission array of the OAM system.

In some embodiments of the disclosure, when the receiver receives the plurality of second reference signals by the plurality of receiving arrays, a receiving direction of each receiving array may be the same.

At step 806, a second target signal is selected from the plurality of second reference signals based on qualities of the plurality of second reference signals.

In some embodiments of the disclosure, the receiver may select the second target signal from the plurality of second reference signals based on the RSRP and/or the RSRQ and/or the SINR. In some embodiments of the disclosure, a second reference signal with a maximum RSRP and/or a maximum RSRQ in the plurality of second reference signals may be determined as the second target signal.

In other embodiments of the disclosure, the receiver may select the second target signal from the plurality of second reference signals based on the BER and/or the BLER. In some embodiments of the disclosure, a second reference signal with a minimum BER and/or a minimum BLER in the plurality of second reference signals may be determined as the second target signal.

At step 807, a receiving array corresponding to the second target signal is determined as a receiving array of the OAM system.

In other embodiments of the disclosure, when the receiving array of the OAM system is determined, second target index information corresponding to the receiving array of the OAM system may be matched with first target index information corresponding to the transmission array of the OAM system and they are stored, so that when the transmitter subsequently transmits a beam by the transmission array of the OAM system, the receiver may receive the beam directly by the corresponding receiving array of the OAM system based on a prestored matching relationship.

In other embodiments of the disclosure, the transmitter may indicate the transmission array used by the transmitter via a signaling. For example, the signaling may include the first target index information, and the transmitter may determine the target transmission array based on the first target index information, to transmit the beam.

In the method for determining a transmission/reception array of an OAM system provided in embodiments of the disclosure, before transmitting the signal, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system; and the receiver receives, respectively by the plurality of receiving arrays, the plurality of second reference signals that are transmitted by the transmitter by the determined transmission array of the OAM system, determines an optimal receiving array of the OAM system of the receiver at a current moment based on qualities of the plurality of second reference signals, and receives the signals by the receiving array of the OAM system.

Thus, even if the transceiver is in a mobile scenario or the transmitter transmits OAM signals in different modes, the transmitter may ensure that the signals are transmitted via an optimal transmission array when transmitting the signals each time, and the receiver may ensure that the signals are received via an optimal receiving array when receiving the signals each time, which effectively solves the OAM communication problem in the coaxial, multi-modal and mobile scenario.

In addition, in embodiments of the disclosure, when the transmission array of the OAM system and the receiving array of the OAM system are determined, the transmission arrays of the OAM system in different cases may be correspondingly matched with the receiving arrays of the OAM system and they are stored, so that when the transmitter subsequently transmits the signals by the transmission array of the OAM system again, the receiver may directly determine the receiving array of the OAM system matching the transmission array of the OAM system based on the prestored matching relationship between transmission arrays and receiving arrays, and determine an optimal receiving array of the OAM system without necessarily traversing each receiving array, which reduces steps and improves efficiency.

Figure 9:
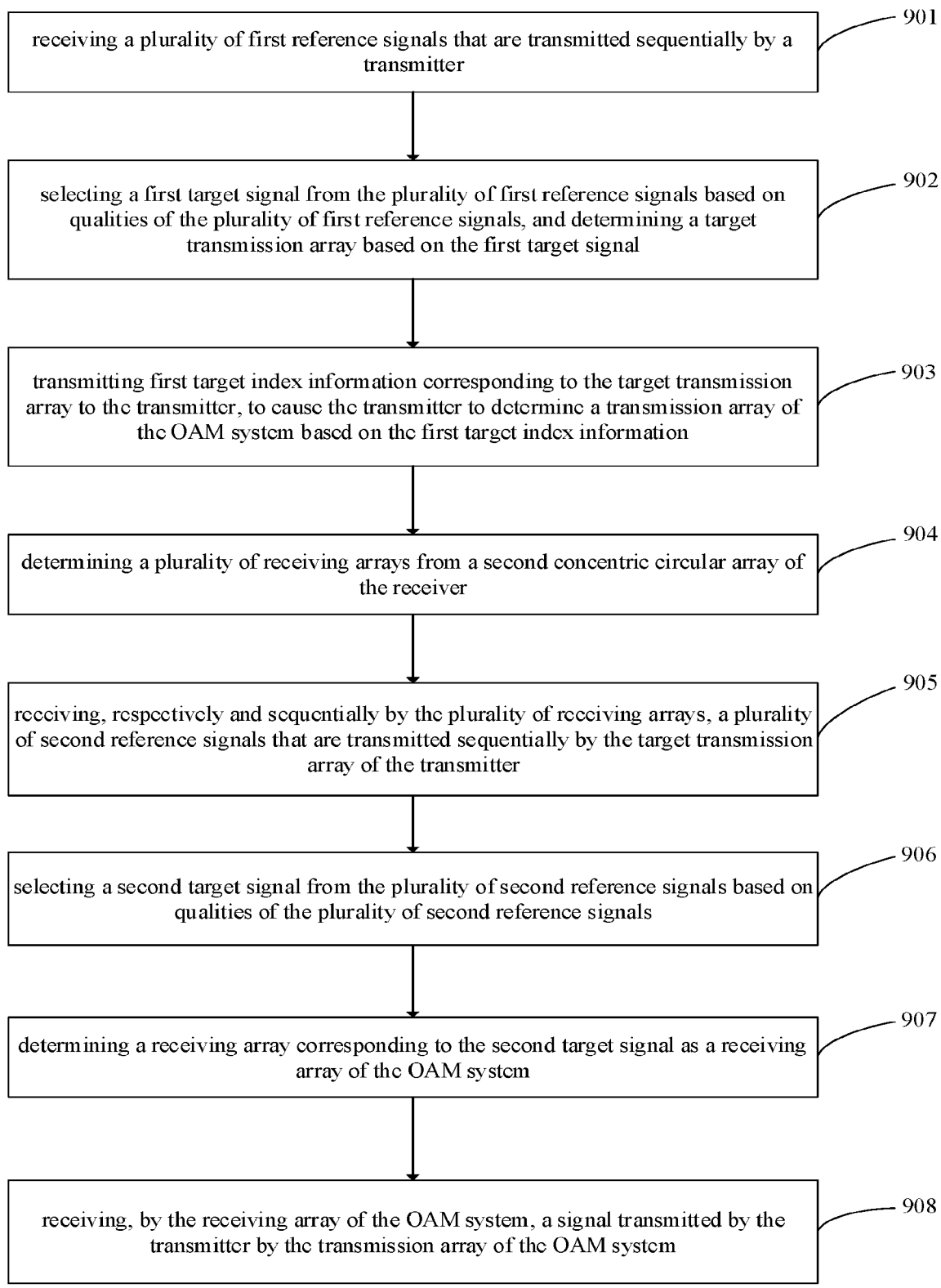
FIG. 9 is a flowchart illustrating another method for determining a transmission/reception array of an OAM system provided in some embodiments of the disclosure.

FIG. 9 is a flowchart illustrating another method for determining a transmission/reception array of an OAM system provided in some embodiments of the disclosure. As illustrated in FIG. 9, the method for determining a transmission/reception array of an OAM system is performed by a receiver and may include the following steps.

At step 901, a plurality of first reference signals that are transmitted sequentially by a transmitter are received.

In some embodiments of the disclosure, the receiver in embodiments of the disclosure may be any UE or any access network device (such as a base station). It needs to be noted that, when the transmitter is a UE, the receiver may be a base station; and when the transmitter is a base station, the receiver may be a UE.

The plurality of first reference signals may be transmitted by the transmitter in a fixed transmitting direction by using different transmission arrays.

Further, in some embodiments of the disclosure, the receiver may include a second concentric circular array, the second concentric circular array may include at least two circular arrays, and radiuses of different circular arrays are different. A number of circular arrays in the second concentric circular array is the same as a number of circular arrays in the first concentric circular array of the transmitter. The second concentric circular array may be taken as a receiving array of the receiver, to receive signals transmitted by the transmitter.

In some embodiments of the disclosure, when the receiver receives the plurality of first reference signals, the receiver may receive the plurality of first reference signals in a fixed receiving direction by a fixed receiving array.

At step 902, a first target signal is selected from the plurality of first reference signals based on qualities of the plurality of first reference signals, and a target transmission array is determined based on the first target signal.

In some embodiments of the disclosure, the receiver may select a first target signal with the best signal quality from the plurality of first reference signals based on the RSRP and/or the RSRQ and/or the SINR. In some embodiments of the disclosure, for example, a first reference signal with a maximum RSRP and/or a maximum RSRQ in the plurality of first reference signals may be determined as the first target signal.

In other embodiments of the disclosure, the receiver may select the first target signal from the plurality of first reference signals based on the BER and/or the BLER. In some embodiments of the disclosure, a first reference signal with a minimum BER and/or a minimum BLER in the plurality of first reference signals may be determined as the first target signal.

At step 903, first target index information corresponding to the target transmission array is transmitted to the transmitter, to cause the transmitter to determine a transmission array of the OAM system based on the first target index information.

The receiver may determine the first target index information corresponding to the target transmission array based on a prestored mapping relationship between first index information and transmission arrays, and transmit the first target index information to the transmitter, so that the transmitter may determine the corresponding target transmission array based on the first target index information, and determine the target transmission array as the transmission array of the OAM system.

At step 904, a plurality of receiving arrays are determined from a second concentric circular array of the receiver.

In some embodiments of the disclosure, the second circular array may include at least two circular arrays and radiuses of different circular arrays are different. A number of circular arrays in the second concentric circular array is the same as a number of circular arrays in the first concentric circular array of the transmitter. In other embodiments of the disclosure, all circular arrays in the second concentric circular array of the receiver may be determined as the plurality of receiving arrays.

At step 905, a plurality of second reference signals that are transmitted sequentially by the transmitter by the transmission array of the OAM system are received respectively and sequentially by the plurality of receiving arrays.

It should be noted that, in some embodiments of the disclosure, in a process that the receiver receives the plurality of second reference signals, the transmitter transmits the plurality of second reference signals in a fixed direction always by the determined transmission array of the OAM system.

In some embodiments of the disclosure, when the receiver receives the plurality of second reference signals by the plurality of receiving arrays, a receiving direction of each receiving array may be the same.

At step 906, a second target signal is selected from the plurality of second reference signals based on qualities of the plurality of second reference signals.

In some embodiments of the disclosure, the receiver may select the second target signal from the plurality of second reference signals based on the RSRP and/or the RSRQ and/or the SINR. In some embodiments of the disclosure, a second reference signal with a maximum RSRP and/or a maximum RSRQ in the plurality of second reference signals may be determined as the second target signal.

In other embodiments of the disclosure, the receiver may select the second target signal from the plurality of second reference signals based on the BER and/or the BLER. In some embodiments of the disclosure, a second reference signal with a minimum BER and/or a minimum BLER in the plurality of second reference signals may be determined as the second target signal.

At step 907, a receiving array corresponding to the second target signal is determined as a receiving array of the OAM system.

In some embodiments of the disclosure, when the receiving array of the OAM system is determined, second target index information corresponding to the receiving array of the OAM system may be matched with first target index information corresponding to the transmission array of the OAM system and they are stored, so that when the transmitter subsequently transmits a beam by the transmission array of the OAM system, the receiver may receive the beam directly by the corresponding receiving array of the OAM system based on a prestored matching relationship.

In other embodiments of the disclosure, the transmitter may indicate the transmission array used by the transmitter via a signaling. For example, the signaling may include the first target index information, and the transmitter may determine the target transmission array based on the first target index information, to transmit the beam.

At step 908, a signal transmitted by the transmitter by the target transmission array of the OAM system is received by the receiving array of the OAM system determined.

In the method for determining a transmission/reception array of an OAM system provided in embodiments of the disclosure, before transmitting the signal, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system; and the receiver receives, respectively by the plurality of receiving arrays, the plurality of second reference signals that are transmitted by the transmitter by the determined transmission array of the OAM system, determines an optimal receiving array of the OAM system of the receiver at a current moment based on qualities of the plurality of second reference signals, and receives the signals by the receiving array of the OAM system.

Thus, even if the transceiver is in a mobile scenario or the transmitter transmits OAM signals in different modes, the transmitter may ensure that the signals are transmitted via an optimal transmission array when transmitting the signals each time, and the receiver may ensure that the signals are received via an optimal receiving array when receiving the signals each time, which effectively solves the OAM communication problem in the coaxial, multi-modal and mobile scenario.

In addition, in embodiments of the disclosure, when the transmission array of the OAM system and the receiving array of the OAM system are determined, the transmission arrays of the OAM system in different cases may be correspondingly matched with the receiving arrays of the OAM system and they are stored, so that when the transmitter subsequently transmits the signals by the transmission array of the OAM system again, the receiver may directly determine the receiving array of the OAM system matching the transmission array of the OAM system based on the prestored matching relationship between transmission arrays and receiving arrays, and determine an optimal receiving array of the OAM system without necessarily traversing each receiving array, which reduces steps and improves efficiency.

Figure 10:
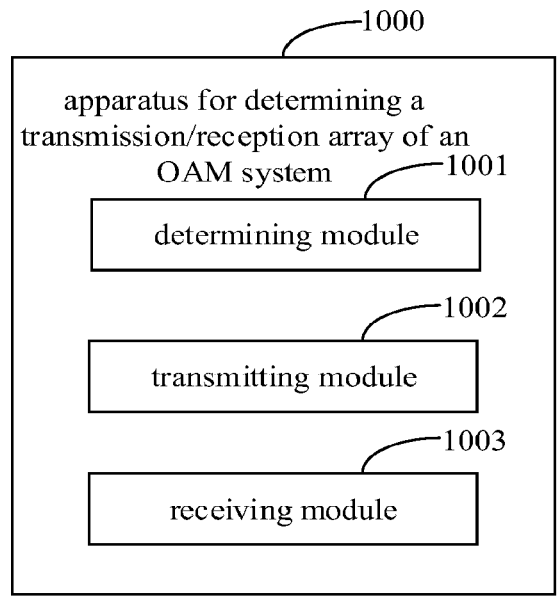
FIG. 10 is a diagram illustrating an apparatus for determining a transmission/reception array of an OAM system provided in some embodiments of the disclosure.

FIG. 10 is a diagram illustrating an apparatus for determining a transmission/reception array of an OAM system provided in some embodiments of the disclosure. As illustrated in FIG. 10, the apparatus 1000 may include a determining module 1001, a transmitting module 1002 and a receiving module 1003.

The determining module 1001 is configured to determine a plurality of transmission arrays from a first concentric circular array of a transmitter.

The transmitting module 1002 is configured to transmit, respectively and sequentially by the plurality of transmission arrays, a first reference signal to a receiver.

The receiving module 1003 is configured to receive first target index information from the receiver, and determine a transmission array of the OAM system based on the first target index information.

In the apparatus for determining a transmission/reception array of an OAM system provided in embodiments of the disclosure, before transmitting the signal, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system. Thus, even if the transceiver is in a mobile scenario or the transmitter transmits OAM signals in different modes, the transmitter may ensure that the signals are transmitted via the optimal transmission array when transmitting the signals each time, which effectively solves an OAM communication problem in a coaxial, multi-modal and mobile scenario.

In some embodiments of the disclosure, the first concentric circular array includes at least two circular arrays and radiuses of different circular arrays are different.

Further, in some embodiments of the disclosure, the determining module 1001 is further configured to determine a plurality of circular arrays in the first concentric circular array as the plurality of transmission arrays.

Further, in some embodiments of the disclosure, determining the transmission array of the OAM system based on the first target index information includes determining a target transmission array corresponding to the first target index information based on a prestored mapping relationship between first index information and transmission arrays, and determining the target transmission array as the transmission array of the OAM system.

Further, in some embodiments of the disclosure, the receiver includes a second concentric circular array, and the receiver receives a plurality of first reference signals from the transmitter by any one circular array in the second concentric circular array.

Further, in some embodiments of the disclosure, a number of circular arrays in the first concentric circular array is the same as a number of circular arrays in the second concentric circular array.

Further, in some embodiments of the disclosure, the apparatus for determining a transmission/reception array of an OAM system is further configured to: transmit, sequentially by the transmission array of the OAM system, a plurality of second reference signals.

Figure 11:
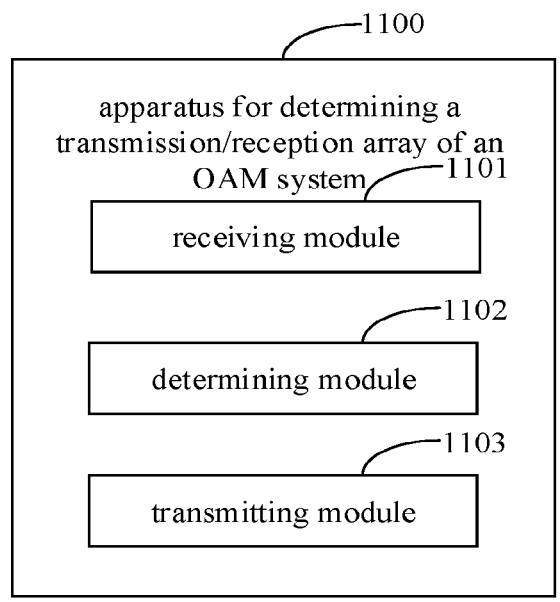
FIG. 11 is a diagram illustrating an apparatus for determining a transmission/reception array of an OAM system provided in some embodiments of the disclosure.

FIG. 11 is a diagram illustrating an apparatus for determining a transmission/reception array of an OAM system provided in some embodiments of the disclosure. As illustrated in FIG. 11, the apparatus 1100 may include a receiving module 1101, a determining module 1102 and a transmitting module 1103.

The receiving module 1101 is configured to receive a plurality of first reference signals that are transmitted sequentially by a transmitter.

The determining module 1102 is configured to determine a first target signal from the plurality of first reference signals, and determine a target transmission array based on the first target signal.

The transmitting module 1103 is configured to transmit first target index information corresponding to the target transmission array to the transmitter, to cause the transmitter to determine a transmission array of the OAM system based on the first target index information.

In the apparatus for determining a transmission/reception array of an OAM system provided in embodiments of the disclosure, before transmitting the signal, the transmitter may transmit the plurality of first reference signals respectively by the plurality of transmission arrays to any one receiving array of the receiver, so that the receiver determines an optimal target transmission array of the transmitter at a current moment based on qualities of the plurality of first reference signals received, and transmit the index information corresponding to the target transmission array to the transmitter, so that the transmitter determines the target transmission array as the transmission array of the OAM system, and transmits the signals by the transmission array of the OAM system; and the receiver receives, respectively by the plurality of receiving arrays, the plurality of second reference signals that are transmitted by the transmitter by the determined transmission array of the OAM system, determines an optimal receiving array of the OAM system of the receiver at a current moment based on qualities of the plurality of second reference signals, and receives the signals by the receiving array of the OAM system.

Thus, even if the transceiver is in a mobile scenario or the transmitter transmits OAM signals in different modes, the transmitter may ensure that the signals are transmitted via an optimal transmission array when transmitting the signals each time, and the receiver may ensure that the signals are received via an optimal receiving array when receiving the signals each time, which effectively solves the OAM communication problem in the coaxial, multi-modal and mobile scenario.

In addition, in embodiments of the disclosure, when the transmission array of the OAM system and the receiving array of the OAM system are determined, the transmission arrays of the OAM system in different cases may be correspondingly matched with the receiving arrays of the OAM system and they are stored, so that when the transmitter subsequently transmits the signals by the transmission array of the OAM system again, the receiver may directly determine the receiving array of the OAM system matching the transmission array of the OAM system based on the pre-stored matching relationship between transmission arrays and receiving arrays, and determine an optimal receiving array of the OAM system without necessarily traversing each receiving array, which reduces steps and improves efficiency.

In some embodiments of the disclosure, the determining module 1102 further configured to select the first target signal from the plurality of first reference signals based on qualities of the plurality of first reference signals.

Further, in some embodiments of the disclosure, determining the target transmission array based on the first target signal includes determining a transmission array for transmitting the first target signal as the target transmission array.

Further, in some embodiments of the disclosure, the apparatus for determining a transmission/reception array of an OAM system is further configured to determine a plurality of receiving arrays from a second concentric circular array of the receive, receive, respectively and sequentially by the plurality of receiving arrays, a plurality of second reference signals that are transmitted sequentially by the target transmission array of the transmitter, determine a second target signal from the plurality of second reference signals, and determine a receiving array corresponding to the second target signal as a receiving array of the OAM system.

Further, in some embodiments of the disclosure, the second concentric circular array includes at least two circular arrays and radiuses of different circular arrays are different.

Further, in some embodiments of the disclosure, the apparatus for determining a transmission/reception array of an OAM system is further configured to determine a plurality of circular arrays in the second concentric circular array as the plurality of receiving arrays.

Further, in some embodiments of the disclosure, the apparatus for determining a transmission/reception array of an OAM system is further configured to select the second target signal from the plurality of second reference signals based on qualities of the plurality of second reference signals.

Further, in some embodiments of the disclosure, the apparatus for determining a transmission/reception array of an OAM system is further configured to receive, by the receiving array of the OAM system, a signal transmitted by the transmitter by the transmission array of the OAM system after determining the receiving array corresponding to the second target signal as the receiving array of the OAM system.

Further, in some embodiments of the disclosure, a number of circular arrays in the first concentric circular array of the transmitter is the same as a number of circular arrays in the second concentric circular array.

In order to implement the above embodiments, a computer storage medium is further provided in the disclosure.

The non-transitory computer storage medium provided in embodiments of the disclosure is stored with an executable program. When the executable program is executed by a processor, the method for determining a transmission/reception array of an OAM system as illustrated in any one of FIGS. 1 to 3 or FIGS. 4 to 9 is performed.

In order to implement the above embodiments, a non-transitory computer program product including a computer program is further provided in the disclosure. When the computer program is executed by a processor, the method for determining a transmission/reception array of an OAM system as illustrated in any one of FIGS. 1 to 3 or FIGS. 4 to 9 is performed.

In addition, in order to implement the above embodiments, a computer program is further provided in the disclosure. When the program is executed by a processor, the method for determining a transmission/reception array of an OAM system as illustrated in any one of FIGS. 1 to 3 or FIGS. 4 to 9 is performed.

Figure 12:
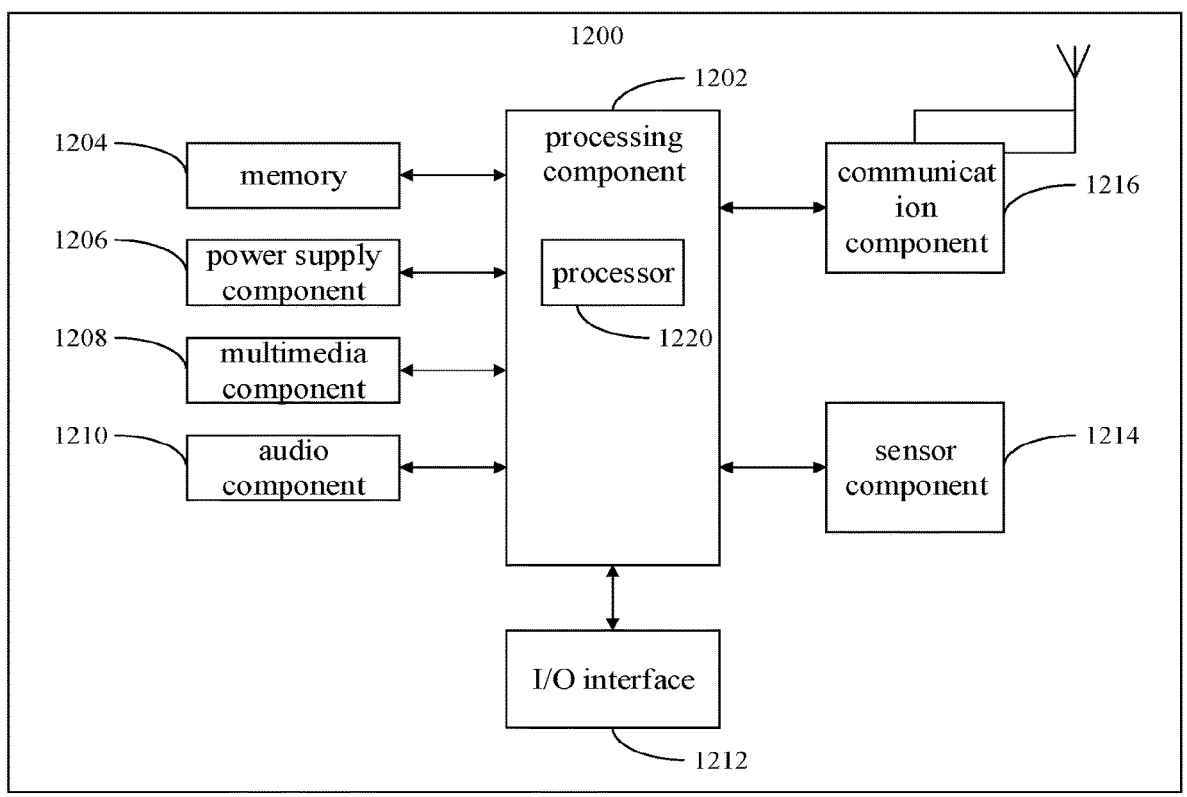
FIG. 12 is a block diagram illustrating a terminal device in some embodiments of the disclosure.

FIG. 12 is a block diagram illustrating a UE 1200 in some embodiments of the disclosure. For example, the UE 1200 may be a mobile phone, a computer, a digital broadcasting terminal equipment, a messaging device, a game console, a tablet device, a medical equipment, a fitness equipment, a personal digital assistant, etc.

As illustrated in FIG. 12, the UE 1200 may include at least one component: a processing component 1202, a memory 1204, a power supply component 1206, a multimedia component 1208, an audio component 1210, an input/output (I/O) of interface 1212, a sensor component 1214, and a communication component 1216.

The processing component 1202 generally controls the whole operation of the UE 1200, such as operations related to display, phone call, data communication, camera operation and recording operation. The processing component 1202 may include one or more processors 1220 to perform instructions, to complete all or part of steps of the above methods. In addition, the processing component 1202 may include at least one module for the convenience of interaction between the processing component 1202 and other components. For example, the processing component 1202 may include a multimedia module for the convenience of interaction between the multimedia component 1208 and the processing component 1202.

The memory 1204 is configured to store all types of data to support an operation of the UE 1200. Examples of the data include the instructions of any application or method operated on the UE 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1206 may provide power supply for all components of the UE 1200. The power supply component 1206 may include a power supply management system, at least one power supply, and other components related to generating, managing and distributing power for the UE 1200.

The multimedia component 1208 includes a screen of an output interface provided between the UE 1200 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 1208 includes a front camera and/or a rear camera. When the UE 1200 in operation mode, such as shooting mode or video mode, the front camera or the rear camera may receive external multimedia data. Each front camera and rear camera may be a fixed optical lens system or an optical lens system with a focal length and an optical zoom capacity.

The audio component 1210 is configured as an output and/or input signal. For example, the audio component 1210 includes a microphone (MIC). When the UE 1200 is in operation mode, such as call mode, record mode, and speech recognition mode, a microphone is configured to receive external audio signals. The audio signals received may be further stored in the memory 1204 or sent via the communication component 1216. In some embodiments, the audio component 1210 further includes a speaker configured to output an audio signal.

The I/O interface 1212 provides an interface for the processing component 1202 and the peripheral interface module, and the peripheral interface module may be a keyboard, a click wheel, a button, etc. The buttons may include but not limited to a home button, a volume button, a start button and a lock button.

The sensor component 1214 includes at least one sensor configured to provide status assessments in all aspects for the UE 1200. For example, the sensor component 1214 may detect an on/off state of the UE 1200 and relative positioning of the component. For example, the component is a display and a keypad of the UE 1200. The sensor component 1214 may further detect a location change of the UE 1200 or one component of the UE 1200, presence or absence of contact between the user and the UE 1200, an orientation or acceleration/deceleration of the UE 1200, and a temperature change of the UE 1200. The sensor component 1214 may include a proximity sensor, which is configured to detect the existence of the objects nearby without any physical contact. The sensor component 1214 may further include a light sensor such as a CMOS or CCD image sensor, which is configured to use in imaging applications. In some embodiments, the sensor component 1214 may further include an acceleration transducer, a gyroscope sensor, a magnetic sensor, a pressure sensor or a temperature sensor.

The communication component 1216 may be configured for the convenience of wired or wireless communication between the UE 1200 and other devices. The UE 1200 may access wireless networks based on any communication standard, such as WiFi, 2G or 3G, or their combination. In some embodiments, the communication component 1216 receives broadcast signals or broadcast-related information from an external broadcast management system via a broadcast channel. In some embodiments, the communication units 1216 further includes a near field communication (NFC) module to facilitate short-range communication. For example, an NFC module may be implemented based on a radio frequency identification (RFID) technology, an infrared data association (IRDA) technology, an ultra-wideband (UWB) technology, a Bluetooth (BT) technology and other technologies.

In some embodiments, the UE 1200 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

Figure 13:
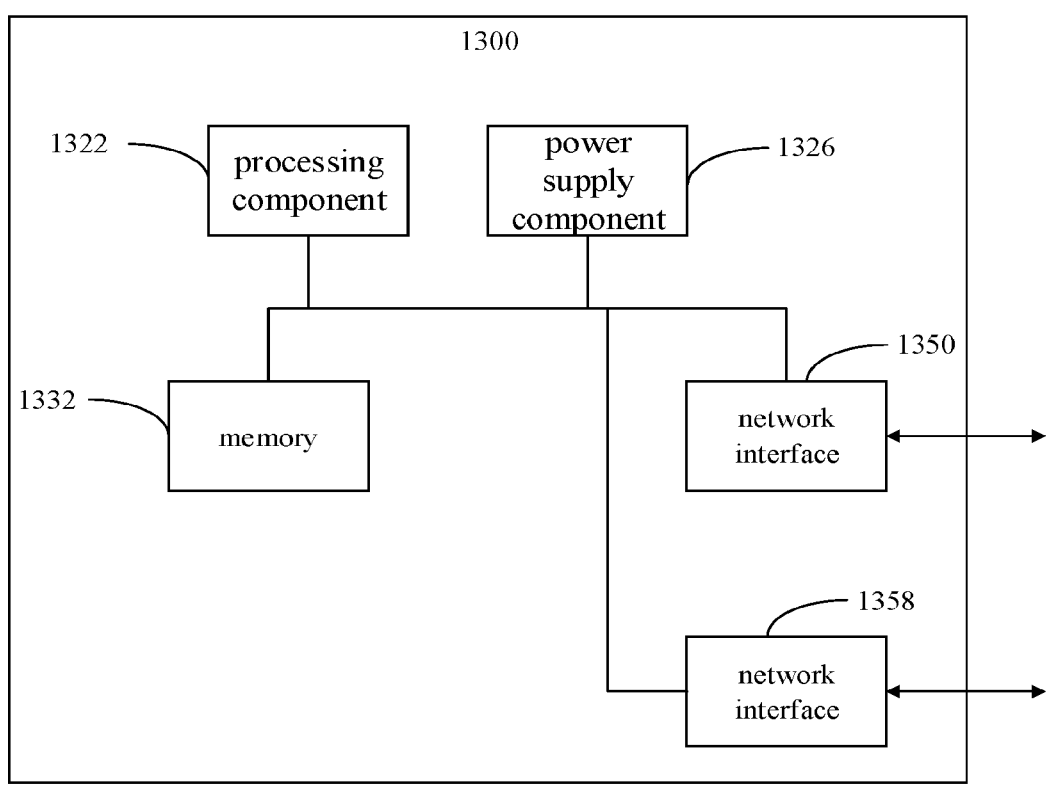
FIG. 13 is a block diagram illustrating an access network device in some embodiments of the disclosure.

FIG. 13 is a diagram illustrating a base station 1300 provided in embodiments of the disclosure. For example, the base station 1300 may be provided as a base station. As illustrated in FIG. 13, a base station 1300 includes a processing component 1322, which further includes at least one processor, and memory resources represented by the memory 1332, which are configured to store non-transitory instructions executable by the processing component 1322, for example, an application. The application stored in the memory 1332 may include one or more modules each of which corresponds to a set of instructions. In addition, the processing component 1322 is configured to execute instructions, to perform the any method applicable to the base station as described in the above methods, for example, the method as illustrated in FIG. 1.

The base station 1300 may further include one power supply component 1326 configured to execute power management of the base station 1300, one wired or wireless network interface 1350 configured to connect the base station 1300 to a network, and one input/output (I/O) interface 1358. The base station 1300 may operate an operating system stored in the memory 1332, for example, Windows Server™, Mac OS X™, Unix™, Linux™, FreeBSD™ or similar.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the disclosure is only limited by the appended claims. The scope of the disclosure is only limited by the appended claims.

What is claimed is:

1. A method for determining a transmission array of an orbital angular momentum (OAM) system, performed by a transmitter, comprising:
   determining a plurality of transmission arrays from a first concentric circular array of the transmitter;
   transmitting, respectively and sequentially by the plurality of transmission arrays, a first reference signal to a receiver; and receiving first target index information from the receiver, and determining the transmission array of the OAM system based on the first target index information;

transmitting, sequentially by the transmission array of the OAM system, a plurality of second reference signals; wherein the plurality of second reference signals are respectively and sequentially received by a plurality of receiving arrays of the receiver and are configured to cause the receiver to determine a second target signal from the plurality of second reference signals and determine a receiving array corresponding to the second target signal as a receiving array of the OAM system.

2. The method according to claim 1, wherein the first concentric circular array comprises at least two circular arrays and radiuses of different circular arrays are different.

3. The method according to claim 2, wherein determining the plurality of transmission arrays from the first concentric circular array of the transmitter comprises:
determining a plurality of circular arrays in the first concentric circular array as the plurality of transmission arrays.

4. The method according to claim 1, wherein determining the transmission array of the OAM system based on the first target index information comprises:
determining a target transmission array corresponding to the first target index information based on a prestored mapping relationship between first index information and transmission arrays; and
determining the target transmission array as the transmission array of the OAM system.

5. The method according to claim 1, wherein the receiver comprises a second concentric circular array and the receiver receives a plurality of first reference signals from the transmitter by any one circular array in the second concentric circular array.

6. The method according to claim 5, wherein a number of circular arrays in the first concentric circular array is the same as a number of circular arrays in the second concentric circular array.

7. An access network device, comprising:
a transceiver;
a memory for storing computer executable instructions; and
a processor respectively connected to the transceiver and the memory, configured to, by executing the computer executable instructions, control transceiving of wireless signals of the transceiver and perform the method of claim 1.

8. A method for determining a transmission/reception array of an orbital angular momentum (OAM) system, performed by a receiver, comprising:
receiving a plurality of first reference signals that are transmitted sequentially by a transmitter;
determining a first target signal from the plurality of first reference signals, and determining a target transmission array based on the first target signal;
transmitting first target index information corresponding to the target transmission array to the transmitter, to cause the transmitter to determine a transmission array of the OAM system based on the first target index information;
determining a plurality of receiving arrays from a second concentric circular array of the receiver;
receiving, respectively and sequentially by the plurality of receiving arrays, a plurality of second reference signals that are transmitted sequentially by the target transmission array of the transmitter;
determining a second target signal from the plurality of second reference signals; and
determining a receiving array corresponding to the second target signal as a receiving array of the OAM system.

9. The method according to claim 8, wherein determining the first target signal from the plurality of first reference signals comprises:
selecting the first target signal from the plurality of first reference signals based on qualities of the plurality of first reference signals.

10. The method according to claim 8, wherein determining the target transmission array based on the first target signal comprises:
determining a transmission array for transmitting the first target signal as the target transmission array.

11. The method according to claim 8, wherein the second concentric circular array comprises at least two circular arrays and radiuses of different circular arrays are different.

12. The method according to claim 11, wherein determining the plurality of receiving arrays from the second concentric circular array of the receiver comprises:
determining a plurality of circular arrays in the second concentric circular array as the plurality of receiving arrays.

13. The method according to claim 8, wherein determining the second target signal from the plurality of second reference signals comprises:
selecting the second target signal from the plurality of second reference signals based on qualities of the plurality of second reference signals.

14. The method according to claim 8, further comprising:
receiving, by the receiving array of the OAM system, a signal transmitted by the transmitter by the transmission array of the OAM system.

15. The method according to claim 8, wherein a number of circular arrays in the first concentric circular array of the transmitter is the same as a number of circular arrays in the second concentric circular array.

16. A terminal device, comprising:
a transceiver;
a memory for storing computer executable instructions; and
a processor respectively connected to the transceiver and the memory, configured to, by executing the computer executable instructions, control transceiving of wireless signals of the transceiver and perform the method of claim 8.

17. An access network device, comprising:
a transceiver;
a memory for storing computer executable instructions; and
a processor respectively connected to the transceiver and the memory, configured to, by executing the computer executable instructions, control transceiving of wireless signals of the transceiver and perform the method of claim 8.

18. A terminal device, comprising:
a transceiver;
a memory; and for storing computer executable instructions
a processor respectively connected to the transceiver and the memory, configured to, by executing the computer executable instructions, control transceiving of wireless signals of the transceiver and:

determine a plurality of transmission arrays from a first concentric circular array of the transmitter;

transmit, respectively and sequentially by the plurality of transmission arrays, a first reference signal to a receiver; and receive first target index information from the receiver, and determine the transmission array of the OAM system based on the first target index information;

transmit, sequentially by the transmission array of the OAM system, a plurality of second reference signals; wherein the plurality of second reference signals are respectively and sequentially received by a plurality of receiving arrays of the receiver and are configured to cause the receiver to determine a second target signal from the plurality of second reference signals and determine a receiving array corresponding to the second target signal as a receiving array of the OAM system.

* * * * *